United States Patent

Harano et al.

Patent Number: 5,242,955
Date of Patent: Sep. 7, 1993

[54] COMPOSITION COMPRISING POLYETHER COMPOUNDS, A PROCESS FOR THE PREPARATION THEREOF AND A CURABLE RESIN COMPOSITION

[75] Inventors: Yoshiyuki Harano; Sozo Namai, both of Otake, Japan

[73] Assignee: Daicel Chemical Industries, Ltd., Sokai, Japan

[21] Appl. No.: 784,379

[22] Filed: Oct. 29, 1991

[30] Foreign Application Priority Data

Oct. 30, 1990 [JP] Japan .................. 2-293404
Apr. 4, 1991 [JP] Japan .................. 3-71912

[51] Int. Cl.$^5$ ............................ C08F 22/20
[52] U.S. Cl. .................. 522/181; 526/309; 526/282; 526/273; 525/327.3
[58] Field of Search .......... 528/393, 366; 526/282, 526/309, 273; 560/220; 525/327.3; 522/181

[56] References Cited

U.S. PATENT DOCUMENTS 4,841,017 6/1989 Murai et al. ............ 525/327.3
5,043,866 8/1991 Isozaki .................. 523/410

FOREIGN PATENT DOCUMENTS 2-233709 9/1990 Japan.

OTHER PUBLICATIONS

Chem. Abstr. 114:84011n (Abstr. of JP 2-233,709).

*Primary Examiner*—Joseph L. Schofer
*Assistant Examiner*—Mark Nagumo
*Attorney, Agent, or Firm*—Morgan & Finnegan

[57] ABSTRACT

A composition comprising alicyclic polyether compounds represented by the formula (I):

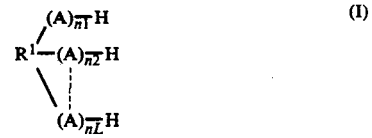

containing structural units A having an ether bond derived from an alicyclic epoxy group and one (meth)acrylic group, and n is an integer of from 1 to 100, $R^1$ is a radical of an organic compound having L active hydrogens or HO—, from n1 to nL is an integer of from 1 to 100, respectively, the total is 1 to 100, L is an integer of from 1 to 100, which is the number of active hydrogen in said organic compound.

Curable resin compositions can be prepared by the addition of a photo-polymerizable initiator.

7 Claims, No Drawings

COMPOSITION COMPRISING POLYETHER COMPOUNDS, A PROCESS FOR THE PREPARATION THEREOF AND A CURABLE RESIN COMPOSITION

FIELD OF THE INVENTION

The present invention relates to a novel composition comprising alicyclic polyether compounds, which is, for example, obtained by a ring opening reaction of an alicyclic epoxy compound having (meth)acrylic group with a ring-opening initiator, and further relates a process for the preparation thereof.

Furthermore, the present invention also relates to a curable resin composition which comprises the above-described composition comprising alicyclic polyether compounds and a polymerization initiator.

BACKGROUND OF THE INVENTION

Hitherto, various types of photo-curable or heat-curable resin compositions have been well known.

The heat-curable resin compositions have been used in a wide range of uses such as materials for molding, materials for injection molding, coatings and adhesives, in spite of that the resin has a disadvantage of accompanying considerable cubical shrinkage in curing process.

On the other hand, the photo-curable resin compositions, which can be cured by an active energy beam such as ultraviolet rays or electronic rays, have been widely used in various fields such as, for example, inks, coatings, varnishes, encapsulating materials, photoresist materials and film materials for protecting.

Recently, there have been developed photo-curable resin compositions, with which a complicated model or various articles having a fixed shape for preparing a casting die or profiling processes can be manufactured by irradiating an active energy beam.

Particularly, a photo-curable resin composition is more advantageous in comparison with a heat-curable resin composition, because of (1) the short curing period of time, (2) curability in low temperatures and (3) unnecessary or small amount of solvents resulting in material saving and further low pollution in surroundings.

Accordingly, it has been actively developed in various fields.

For example, a polyester acrylate, a polyether acrylate, an epoxy acrylate and or a polyurethane acrylate, etc., which have at least two acrylic or methacrylic groups, have been typically supplied on a commercial basis.

Recently, such acrylate resin compositions have been widely used in various fields such as, for example, as coating compositions for wooden products or paper, etc., an reactivity modifier for thermoplastic resins such as polyvinyl chloride resins, an anaerobic adhesive, or as a resin for a photoresist, etc., in addition to the above-described uses.

However, the above-described acrylate coatings do not have sufficient curing velocity, hardness, ductility and outdoor durability, etc., and novel materials having well-balanced properties have been desired.

The present inventors have found that the drawbacks of prior art materials can be avoided by the use of a polyfunctional (meth)acrylate composition having cyclohexane units and ether groups in the main molecular chain of the molecule, and (meth)acrylic groups as a side chain for the above-described uses.

SUMMARY OF THE INVENTION

An object of the present invention is to provide a novel composition comprising alicyclic polyether compounds having (meth)acrylic groups as a side chains and a process for the preparation thereof.

Another object of the present invention is to provide a photo-curable resin composition comprising the above-described composition and a curing agent.

DETAILED DESCRIPTION OF THE INVENTION

The present invention is described hereinafter in more detail.

According to a first aspect of the present invention, there is provided a composition comprising alicyclic polyether compounds represented by the following formula (I):

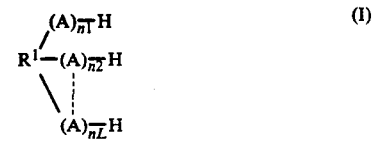

which contains partial structural units A having an ether bond derived from an alicyclic epoxy group and one (meth)acrylic group and wherein n is an integer of from 1 to 100, $R^1$ is a radical of an organic compound having L active hydrogens or is HO—, from n1 is an integer of from 1 to 100, respectively, the total being 1 to 100, L is an integer of from 1 to 100, which is the number of active hydrogen in the organic compound.

According to a second aspect of the present invention, there is provided a process for the preparation of the composition.

It is noted that the ether units in partial structural units A are formed by the ring opening of the epoxy group possessed by a (meth)acrylic compound having an alicyclic epoxy group [hereinafter referred to as (a)].

In the alicyclic polyether compounds represented by formula (I) according to the present invention, $R^1$ is a radical of an organic compound having at least one active hydrogen atom.

The organic compounds having at least one active hydrogen atom which are precursor of the radical include alcohols, phenols, carboxylic acid, amines and thiols. As alcohols, either monohydric alcohols or polyhydric alcohols may be used. For instance, aliphatic alcohols such as methanol, ethanol, propanol, butanol, pentanol, hexanol, octanol; aromatic alcohols such as benzyl alcohol; polyhydric alcohols such as ethylene glycol, diethylene glycol, triethylene glycol, polyethylene glycol, propylene glycol, dipropylene glycol, 1,3-butanediol, 1,4-butanediol, pentanediol, 1,6-hexanediol, neopentyl glycol, neopentyl glycol oxypivalate, cyclohexanedimethanol, glycerine, diglycerine, polyglycerine, trimethylolpropane, trimethylol ethane, pentaerythritol, dipentaerythritol, a hydrogenated bisphenol A, a hydrogenated bisphenol F, a hydrogenated bisphenol S, etc., are included.

Phenols include phenol, cresol, catechol, pyrogallol, hydroquinone, hydroquinone monomethylether, bisphenol A, bisphenol F, 4,4'-dihydroxybenzophenone, bisphenol S, phenol resins, cresol novolak resins, etc.

Carboxylic acids include formic acid, acetic acid, propionic acid, butyric acid, fatty acids of animal and vegetable oil and fats, fumaric acid, maleic acid, adipic acid, dodecanedioic acid, trimellitic acid, pyromellitic acid, polyacrylic acid, phthalic acid, isophthalic acid, terephthalic acid, etc.

In addition, compounds having a hydroxyl group together with a carboxylic acid group such as lactic acid, citric acid, oxycaproic acid, etc., are included.

Amines include monomethylamine, dimethylamine, monoethylamine, diethylamine, propylamine, monobutylamine, dibutylamine, pentylamine, hexylamine, cyclohexylamine, octylamine, dodecylamine, 4,4'-diaminodiphenylmethane, isophorondiamine, toluenediamine, hexamethylene diamine, xylene diamine, diethylene triamine, triethylene tetramine, ethanolamine, etc.

Thiols include mercaptans such as methyl mercaptan, ethyl mercaptan, propyl mercaptan, phenylmercaptan, etc., mercaptopropioic acid or polyhydric alcohol esters of mercaptopropioic acid, such as ethylene glycol bismercapto propionate, trimethylolpropane trimercapto propionate, pentaerythritol pentamercaptopropioic acid, etc.

Furthermore, other compounds having active hydrogen atoms include polyvinyl alcohol, partially hydrolyzed products of polyvinyl acetate, starch, cellulose, cellulose acetate, cellulose acetate butylate, hydroxyethyl cellulose, acrylic polyol resins, styrene-allyl alcohol copolymer resins, styrene-maleic acid copolymer resins, alkyd resins, polyester polyol resins, polyester carboxylic acid resins, polycaprolactone polyol resins, polypropylene polyol, polytetramethylene glycol, polycarbonatepolyols, and a polybutadiene having hydroxyl groups, cellulose polymers such as hydroxylethylcelluloses, cellulose acetates, etc.

Still further, the compounds having at least one active hydrogen atom may have an unsaturated double bond in their structure, examples of which include allyl alcohol, acrylic acid, methacrylic acid, 3-cyclohexenemethanol, tetrahydrophthalic acid, etc.

One or more of such compounds having active hydrogen atoms can be used. It is noted that water or small amount of water contained in starting materials can also be used as an initiator without using the above-described compounds having active hydrogen atoms to prepare the polyether compound represented by general formula (I).

In the case of using water, $R^1$ is represented by HO— in the formula (I). In the polyether compounds represented by the general formula (I), the partial structural unit A is the radical derived from (a).

n1, n2 through nL in the general formula (I) are an integer of from 1 to 100, respectively, and the sum of the integers is from 1 to 100.

If the sum is more than 100, undesired resins having a high melting point are obtained which are not preferred and can not be used practically. L represents an integer of from 1 to 100, which is dependent upon a functionality of the compound having active hydrogen atoms.

That is, L corresponds to the functionality of the compound which is the precursor of $R^1$. For example, in the case of using trimethylolpropane as the compound having active hydrogen atoms, L is inevitably 3.

A composition comprising alicyclic polyether compounds represented by the formula (I) of the present invention can be prepared by the ring opening reaction of a compound having an alicyclic epoxy group and (meth)acrylic group with the above-described compound having active hydrogen atoms, in the presence of catalysts.

Specific compound having an alicyclic epoxy group and (meth)acrylic group includes; for example:

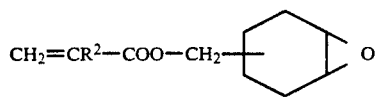

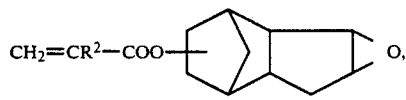

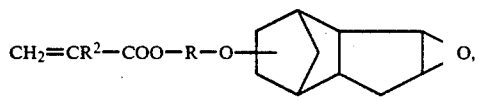

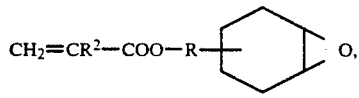

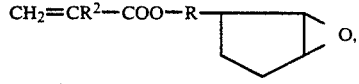

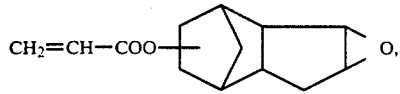

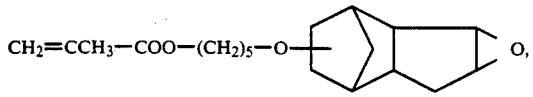

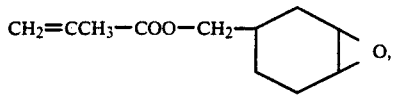

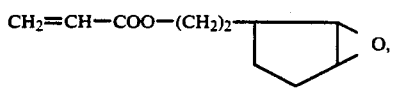

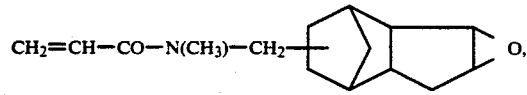

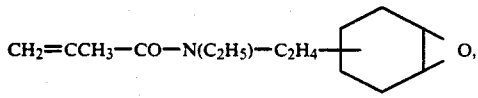

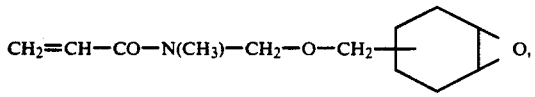

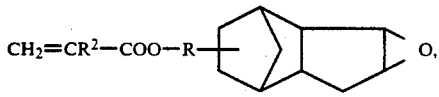

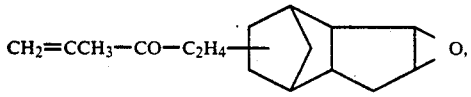

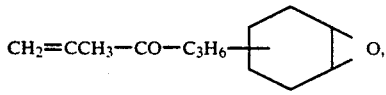

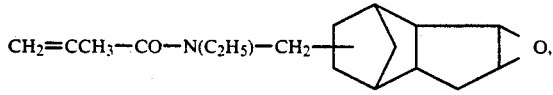

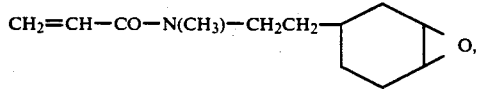

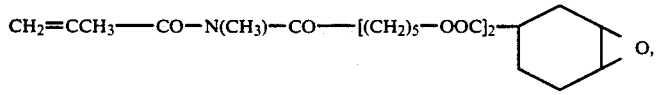

wherein, $R^2$ is hydrogen or a methyl group, R represents —$CH_2$— to —$(CH_2)_8$—, respectively.

A preferred compound having an alicyclic epoxy group and (meth)acrylic group is

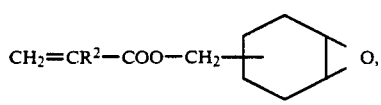

which is 3,4-epoxycyclohexylmethyl (meth)acrylate.

The partial structural units A may include a radical derived from a compound [hereinafter referred to as (b)] having at least one epoxy groups other than (a).

In the case that (b) is used together with the above-described (a) in the ring opening reaction, the radical derived from (b) is also introduced into the molecule of the polyether compounds of the formula(I).

The mixing ratio of (a) to (b) is preferably from 1/100 to 100/1.

Where (a) is less than 1/100, the curability in such a photocurable resin composition is undesirably not sufficient because of the considerably low content of (meth-)acrylic groups.

Specifically, (b) includes the various compounds having at least one epoxy groups described hereinafter;

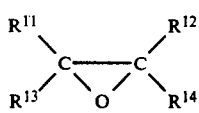

wherein $R^{11}$, $R^{12}$, $R^{13}$ and $R^{14}$ is hydrogen or a radical of an organic compound, respectively.

Typical (b) compounds include, for example:

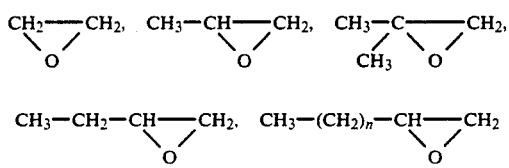

wherein n is an integer of from 2 to 25 in an alpha-olefin epoxide,

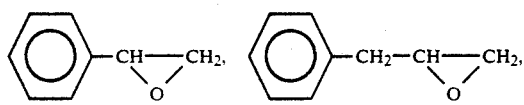

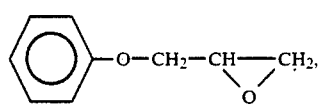

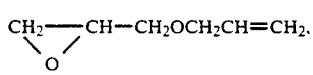

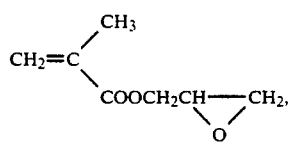

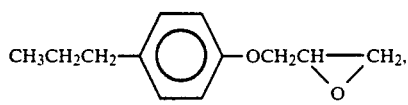

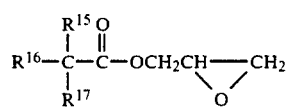

wherein $R^{15}$, $R^{16}$ and $R^{17}$ are a radical derived from an ester of a $C_8$-$C_{11}$ tert-carboxylic acid having, respectively, alicyclic epoxy resins such as

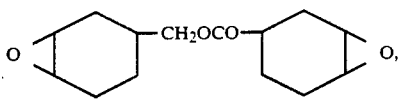

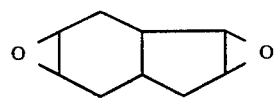

polyalcohols such as

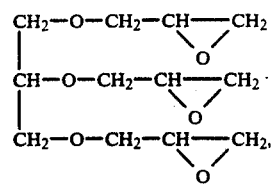

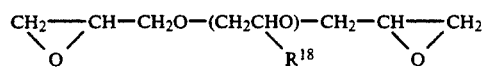

wherein $R^{18}$ is hydrogen atom or an alkyl group, etc., respectively, and glycidylether of polyglycol, polyolefin epoxy resins such as epoxidated soybean oil, epoxidated linseed oil, etc., heterocyclic epoxy resins such as diglycidyl hydantoin, triglycidyl isocyanurate, etc., glycidyl amine type resins such as tetraglycidyl diaminodiphenylmethane, triglycidyl p-aminophenol etc., glycidyl ester type such as diglycidyl phthalate or diglycidyl tetrahydrophthalate, etc., and bisphenol A type epoxy resins or bisphenol F type epoxy resins, novolak type epoxy resins etc.

Two or more two epoxy compounds described hereinabove can be also used.

When a compound represented by general formula (b)

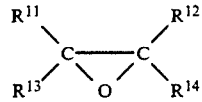 (b)

wherein $R^{11}$, $R^{12}$, $R^{13}$ and $R^{14}$ is hydrogen or a radical of an organic compound, respectively is used as the compound having at least one epoxy group with (a), the structural unit

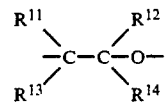

and the structural unit, for example,

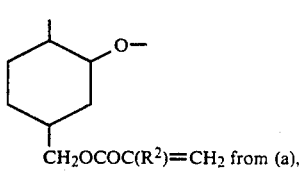

$R^2$ represents hydrogen or methyl group, are introduced in random or block fashion into the molecule of the instant polyether compounds of formula(I).

In the ring opening reaction of 3,4-epoxycyclohexylmethyl (meth)acrylate and the above-described compound having at least one epoxy groups with a compound having at least one active hydrogen atoms, when the former and the latter are allowed to simultaneously react, the resulting copolymer includes the above-described two structural units in random fashion.

On the other hand, when either the former or the latter is allowed to separately react with a compound having at least one active hydrogen atoms, the resulting copolymer includes the above-described two structural units in block fashion.

Both type of reaction steps can be carried out in the present invention. The reaction is preferably carried out in the presence of catalyst.

Catalysts include amines such as methylamine, ethylamine, propylamine, piperazine, and the like; organic bases such as pyrizines, imidazoles, and the like; organic acids such as quaternary ammonium salts such as tetrabutyl ammonium bromide, and the like; formic acid, acetic acid, propionic acid and the like; inorganic acids such as sulfuric acid, hydrochloric acid, and the like; alcoholates of alkali metals such as sodium methylate and the like; alkalis such as KOH, NaOH, and the like; Lewis acids such as $BF_3$, $ZnCl_2$, $AlCl_3$, $FeCl_3$, $SnCl_4$ and the like; or complex compounds of the Lewis acids, and organometallic compounds such as triethyl aluminum, diethyl zinc, and the like.

These catalysts are used in a concentration of from 0.01 to 10% by weight, and preferably from 0.1 to 5%, based on the weight of the starting materials forming the mixture.

The reaction can be carried out at the temperature of from $-20°$ to $200°$ C., preferably from $0°$ to $100°$ C. The reaction can be carried out in the presence or absence of solvent.

A solvent having active hydrogen atoms cannot be used, e.g., ketones such as acetone, methyl ethyl ketone, methyl isobutyl ketone, and the like. On the other hand, aromatic solvents such as benzene, toluene, xylene, and the like and the ethers, aliphatic hydrocarbons, and esters can be used.

Furthermore, a polymerization inhibitor is preferably used for the purpose of preventing thermal radical polymerization of the (meth)acrylic groups. The polymerization inhibitor includes hydroquinone, hydroquinone monomethylether, etc.

Still further, air or a mixture of air with nitrogen gas are preferably supplied into the reaction liquid or gas atmosphere over the reaction liquid for the purpose of preventing polymerization.

The desired product can be obtained by a conventional chemical engineering process such as a concentration, etc., from the crude reaction solution.

According to a third aspect of the present invention, there is provided a photo-curable resin composition which comprises the above-described composition comprising alicyclic polyether compounds represented by the formula (I), and a polymerization initiator.

Examples of polymerization initiators specifically include a photopolymerizing initiator, an azo-compound and an organic peroxide, etc.

Examples of the photo-polymerizing initiator specifically include

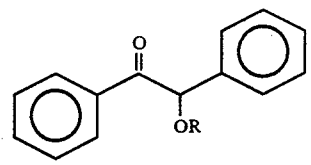

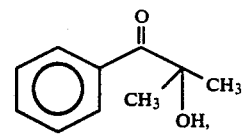

R is $C_4H_9$ or iso-$C_4H_8$,

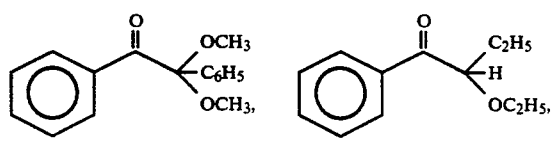

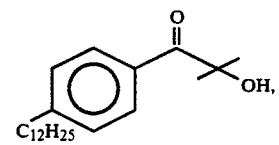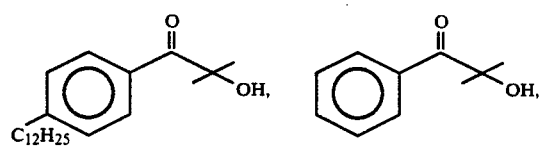

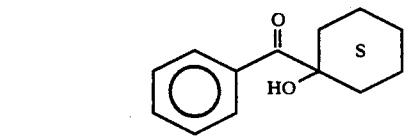

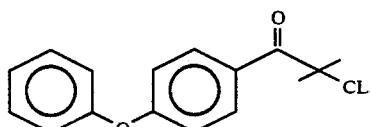

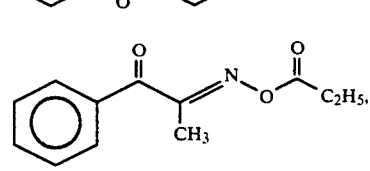

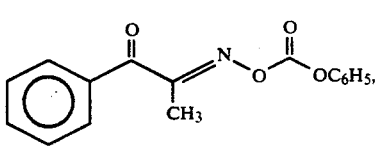

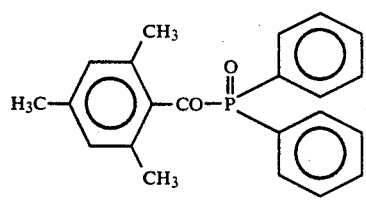

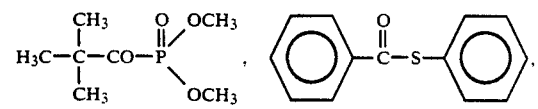

-continued

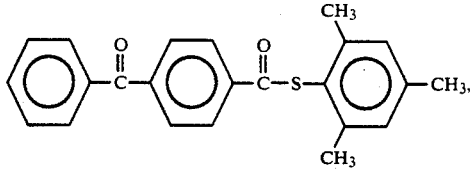

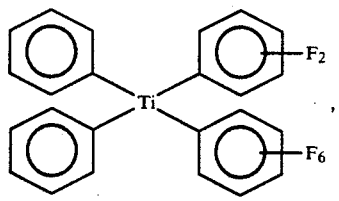

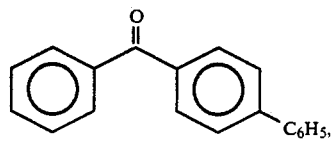

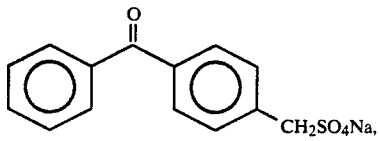

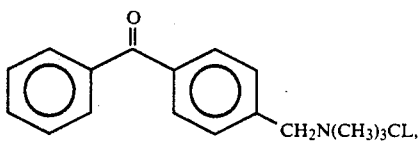

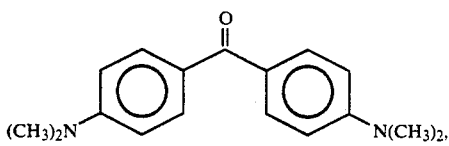

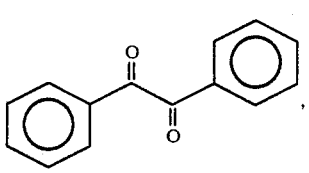

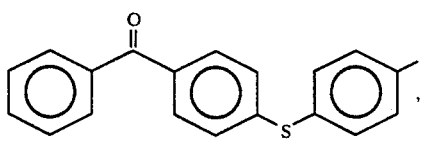

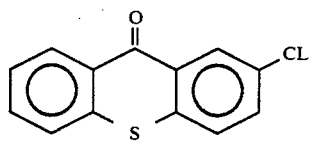

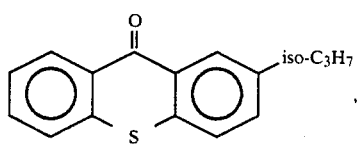

-continued

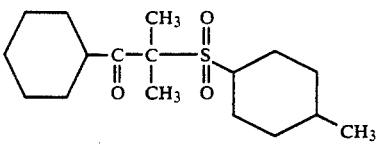

Trigonal 121(manufactured by Azo Co.), Darocure 1664(manufactured by E. Merck Co.), Ultracure DTX(Sherwin-Williams Co.) and TBA(manufactured by BASF Co.), etc.

Examples of the azo-compound specifically include 2,2'-azobisisobutyronitryl, 2,2'-azobis(2,4-dimethylvarelonitryl), 1,1'-azobis(1-cycrohexanecarbonitryl), dimethyl-2,2'-azobisisobutylate, etc.

Examples of the organic peroxide specifically include a peracyl compound such as acetyl peroxide, benzoyl peroxide and lauroyl peroxide, etc., a perester compound such as tert-butyl perester of pivalic acid, tert-butyl perester of 2-ethylhexanoic acid, tert-butyl perester of benzoic acid, etc., a hydroperoxide such as tert-butyl peroxide, dialkylcumenperoxide, etc., a percarbonate such as bis(4-tert-butylcyclohexyl) peroxycarbonate, etc.

The above-described polymerization initiators in the curable composition are preferably mixed in a range of from 0.05 to 20 parts by weight, more preferably from 0.5 to 10 parts by weight, based on the composition comprising alicyclic polyether compounds represented by the formula (I).

One or more than one polymerization initiators may be used. Furthermore, other various polymerizable monomers can be used together with the composition comprising alicyclic polyether compounds of formula (I) for the purpose of a modification in the characteristics of cured products.

Examples of the various polymerizable monomers include an ester of an unsaturated aliphatic acid, an aromatic vinyl compound and a curable multifunctional monomer, etc.

The ester of an unsaturated aliphatic acid specifically includes an alkyl(meth)acrylate such as methyl(meth)acrylate, ethyl(meth)acrylate, butyl(meth)acrylate, 2-ethylhexyl(meth)acrylate, cyclohexyl(meth)acrylate, etc., an aromatic (meth)acrylic ester such as phenyl(meth)acrylate, benzyl(meth)acrylate, 1-naphthyl(meth)acrylate, etc.

The aromatic vinyl compound specifically includes a styrene derivative such as styrene or alpha-methylstyrene, etc.

The curable multifunctional monomers specifically include a di(meth)acrylate such as ethyleneglycol di(meth)acrylate, diethyleneglycol di(meth)acrylate, 1,4-butanedioldi(meth)acrylate, 1,5-pentanediol di(meth)acrylate, neopentylglycol di(meth)acrylate, etc., a bifunctional curable monomer such as diarylphthalate, diarylisophthalate, diarylcarbonate, etc., a trifunctional curable monomer such as trimethylol ethane tri(meth)acrylate, trimethylol propanetri(meth)acrylate, a tetrafunctional curable monomer such as pentaerythritol tetra(meth)acrylate, etc.

Still further, various additives such as a sensitizer, solvents, resins for modifying, reactive compounds, a dye, a pigment, a leveling agent and a wetting agent, etc., can also be optionally mixed.

In the following Examples and Application Examples are presented in order to specifically illustrate the present invention, and should not be construed as being limiting in any way as to the scope of the present invention.

SYNTHESIS EXAMPLE 1

1.1 g (35 milli mole) of methanol, 29.5 g. (150 milli mole) of 3,4-epoxycyclohexylmethylmethacrylate and 50 g. of ethyl acetate as a solvent were charged into a flask having a capacity of 100 mL equipped with a reflux condenser, a dropwise funnel and a stirrer, followed by being sufficiently mixed.

Successively, the solution was heated to 40° C., and then 10.85 g. of ethyl acetate solution containing 0.85 g. of $BF_3O(C_2H_5)_2$ which is a catalyst, was added dropwise from the funnel and the mixture allowed to react over approximately 3 hours.

After the dropwise addition, the completion of the reaction was confirmed by the oxirane oxygen content of less than 0.5%.

After the completion of the reaction, the reaction mixture was washed with 50 g. of water and allowed to separate into organic solution layer and water solution layer and the organic solution layer was separated by decantation.

The separated organic solution was washed and separated again, and then the solvent was distilled from the organic solution layer to obtain 24.8 g. of an oily compound having slight yellow color.

It was confirmed by $^1$H-NMR analysis (based on $CDCl_3$, tetramethyl silane) and IR analysis that the oily compound is represented by the following chemical formula.

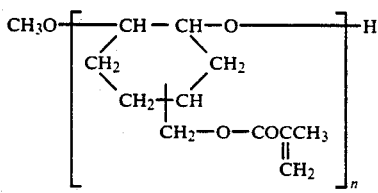

wherein, n is approximately 4

In the $^3$H-NMR analysis chart, total 10 Hs composed of 7 Hs due to hydrogens attached to carbons which are not adjacent to oxygen atom in cyclohexane ring and 3 Hs due to hydrogens in methyl group of methacrylic group at 1.0 to 2.3 ppm, and approximately total 5 Hs composed of 4 Hs (2 Hs due to —$CH_2$—O— and 2 Hs due to methine groups adjacent to oxygen) and approximately 1H (approximately ¼ due to hydrogen in —$OCH_3 \times 3+$ approximately ¼ due to hydrogen in —OH) due to —$OCH_2$ group and —OH group at 3.0 to 4.2 ppm, were observed in turn from the side of high magnetic field.

Furthermore, 2 Hs due to methylene unit in methacrylic group were observed at 5.5 ppm and 6.1 ppm.

In the IR spectrum chart, the following absorption peaks were observed:
3500 $cm^{-1}$, 2922 $cm^{-1}$, 1715 $cm^{-1}$, 1635 $cm^{-1}$, 1449 $cm^{-1}$, 1371 $cm^{-1}$, 1319 $cm^{-1}$, 1294 $cm^{-1}$, 1160 $cm^{-1}$, 1073 $cm^{-1}$, 1008 $cm^{-1}$, 931 $cm^{-1}$.

The product was designated as sample A.

SYNTHESIS EXAMPLE 2

1.9 g (60 milli mole) of methanol, 18.2 g. (100 milli mole) of 3,4-epoxycyclohexylmethylacrylate, 19.6 g. (200 milli mole) of 1,2-epoxycyclohexane and 70 g. of ethyl acetate as a solvent were charged into a flask having a capacity of 100 mL equipped with a reflux condenser, a dropwise funnel and a stirrer, followed by being sufficiently mixed. Successively, the solution was heated to 40° C., and then 11.0 g. of ethyl acetate solution containing 1.0 g. of $BF_3O(C_2H_5)_2$ which is a catalyst, was added dropwise from the funnel and the mixture allowed to react over approximately 4 hours.

After the dropwise addition, the completion of the reaction was confirmed by the oxirane oxygen content of less than 0.3%.

After the completion of the reaction, washing with water and separation were carried out twice, respectively, and the solvent was removed from organic solution layer by distillation to obtain 31.7 g. of an oily colorless compound having transparency.

It was confirmed by $^1$H-NMR (based on $CDCl_3$, tetramethyl silane) analysis and GPC analysis that the oily product is the polyether compound having weight average molecular weight of 720 containing 3,4-epoxycyclohexylmethylacrylate unit and 1,2-epoxycyclohexane unit at the ratio of 2/5.

In the $^1$H-NMR analysis chart, 27 Hs due to cyclohexane ring at 0.5 to 2.4 ppm, 10 Hs at 2.5 to 4.3 ppm, 3 Hs due to acryl group at 5.6 to 7.4 ppm, were observed in turn from the side of high magnetic field. having weight average molecular weight of 720 containing 3,4-epoxycyclohexylmethylacrylate unit and 1,2-epoxycyclohexane unit at the ratio of 2/5.

Furthermore, in the IR spectrum chart, the following absorption peaks were observed:
3500 $cm^{-1}$, 2920 $cm^{-1}$, 1715 $cm^{-1}$, 1635 $cm^{-1}$, 1449 $cm^{-1}$, 1371 $cm^{-1}$, 1319 $cm^{-1}$, 1294 $cm^{-1}$, 1160 $cm^{-1}$, 1073 $cm^{-1}$, 1008 $cm^{-1}$, 931 $cm^{-1}$.

The product was designated as sample B.

SYNTHESIS EXAMPLE 3

4.7 g (35 milli mole) of trimethylolpropane, 82.6 g. (350 milli mole) of

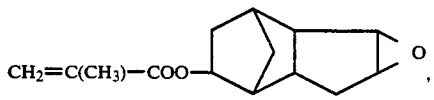

and 100 g. of ethyl acetate as a solvent were charged into a flask having a capacity of 300 mL equipped with a reflux condenser, a dropwise funnel and a stirrer, followed by being sufficiently mixed. Successively, the solution was heated to 50° C., and then 10.85 g. of ethyl acetate solution containing 0.85 g. of $BF_3O(C_2H_5)_2$ which is a catalyst, was added dropwise from the funnel and the mixture allowed to react over approximately 3 hours.

After the dropwise addition, the completion of the reaction was confirmed by the oxirane oxygen content of less than 0.5%.

After the completion of the reaction, washing with 200 g. of water and separation were carried out twice, respectively, and the solvent was removed from organic solution layer by distillation to obtain 73.3 g. of a slightly-yellowed high viscous compound.

It was confirmed that the compound has a number average molecular weight of 2000 based on styrene by GPC analysis.

The product was designated as sample C.

SYNTHESIS EXAMPLE 4

11.8 g (100 milli mole) of 1,6-hexanediol, 155.0 g. (500 milli mole) of an epsilon-caprolactone adduct of 3,4-epoxycyclohexylmethylacrylate, 100 g. and 100 g. of ethyl acetate as a solvent were charged into the same flask as in Synthesis Example 1, followed by being sufficiently mixed.

Successively, the solution was heated to 40° C., and then 10.60 g. of ethyl acetate solution containing 0.60 g. of $BF_3O(C_2H_5)_2$ which is a catalyst, was added dropwise from the funnel and the mixture allowed to react over 3 hours. The same procedures as in Synthesis Example 4 were repeated to obtain 141 g. of a slightly-yellowed compound. It was confirmed that the compound has a number average molecular weight of 1530 based on styrene by GPC analysis. The product was designated as sample D.

Curability Tests 1 to 5

The polyether compound samples A to D obtained in Synthesis Examples 1 to 4, respectively, and a conventional photo-curable resin (Ebecryl 600 manufactured by UCB S.A., in Belgium) were mixed with a photopolymerization initiator (Irugacure 500 manufactured by Ciba-Geigy, Ltd.) to prepare a coating liquid, as shown in Table 1.

The respective coating liquids were coated on a glass plate with a barcoater and an applicator, and then ultra-violet was irradiated from a high-voltage mercury lamp (lamp input power 120 W/cm) while moving at a conveyer speed of 10 m/minute to prepare cured coating layers for tests in relation to curability.

Curability is shown by the number of times of the ultra-violet ray irradiation required to be free from tackiness, and coating thickness is shown by the irradiation number of times required to cure the coating surface in contact with the glass plate.

The results and respective Test conditions are shown in Table 1.

TABLE 1

|  | Test 1 | Test 2 | Test 3 | Test 4 | Test 5 |
|---|---|---|---|---|---|
| Sample A (g) | 3.0 | — | — | — | — |
| Sample B (g) | — | 10.0 | — | — | — |
| Sample C (g) | — | — | 10.0 | — | — |
| Sample D (g) | — | — | — | 10.0 | — |
| Ebecryl 600 (g) | — | — | — | — | 10.0 |
| Irugacure 500 (g) | 0.12 | 0.4 | 0.4 | 0.4 | 0.4 |
| coating thickness (micron) | 10 | 10 | 800 | 1600 | 800 |
| pencil hardness | H | H | H | H | H |
| irradiation numbers of times | 3 | 1 | 1 | 3 | 5 |

Note:
Ebecryl 600 (manufactured by UCB S.A., in Belgium) is a bisphenol A type epoxy acrylate as a conventional photo-curable resin.

Table 1 clearly shows that the curable resin composition, which comprises a composition of the present polyether compounds having polyether bonds in the main chain and radically polymerizable groups as side chains and a polymerizing initiator, can provide a coating layer having excellent curability either as a thin layer or a thick layer.

While the invention has been described in detail and with reference to specific embodiments thereof, it will be apparent to one skilled in the art that various changes and modifications can be made therein without departing from the spirit and scope thereof.

What is claimed is:

1. A composition comprising alicyclic mono-, di-and polyether compounds represented by the following formula (I):

in which A comprises structural units having ether bonds derived from an alicyclic epoxy group and contains a (meth)acrylic group, n is an integer of from 1 to 100, $R^1$ is a radical of an organic compound having L active hydrogens or is HO—, from n1 to nL is an integer of from 1 to 100, respectively, the total being 1 to 100, L is an integer of from 1 to 100, which is the number of active hydrogen in said organic compound.

2. A composition according to claim 1, wherein said structural units A are

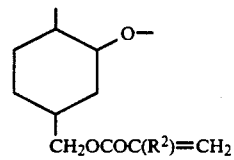

in which $R^2$ represents hydrogen or a methyl group.

3. A composition according to claim 1, in which A further comprises structural units having ether bonds derived from a compound (b) having at least one epoxy group.

4. A composition according to claim 1, in which units A comprise

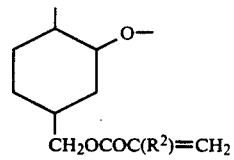

in which $R^2$ represents hydrogen or a methyl group and structural units having ether bonds derived from a compound(b) having at least one epoxy group.

5. A composition according to claim 1, in which total of said n1 to nL is 1 to 10.

6. A process for the preparation of a composition according to claim 1, comprising the ring opening reaction of at least one alicyclic epoxy compound having a (meth)acrylic group, with at least one organic compound having at least one active hydrogen atoms.

7. A curable resin composition which comprises (a) a composition according to claim 1, and (b) a polymerization initiator.

* * * * *